(12) United States Patent
Amaral et al.

(10) Patent No.: US 9,752,514 B2
(45) Date of Patent: Sep. 5, 2017

(54) THERMAL MANAGEMENT SYSTEM FOR THE FEEDING OF FUEL IN INTERNAL COMBUSTION ENGINES

(71) Applicant: MAHLE METAL LEVE S.A., Jundiaí—SP (BR)

(72) Inventors: Tadeu Miguel Malagó Amaral, São Paulo (BR); Ricardo Roveri Bueno, São Paulo (BR); Fernando Jun Yoshino, Jundiaí (BR)

(73) Assignee: MAHLE Metal Leve S.A., Jundiai—SP (BR)

( * ) Notice: Subject to any disclaimer, the term of this patent is extended or adjusted under 35 U.S.C. 154(b) by 112 days.

(21) Appl. No.: 14/767,031

(22) PCT Filed: Feb. 25, 2014

(86) PCT No.: PCT/BR2014/000066
§ 371 (c)(1),
(2) Date: Aug. 11, 2015

(87) PCT Pub. No.: WO2014/127442
PCT Pub. Date: Aug. 28, 2014

(65) Prior Publication Data
US 2016/0017822 A1    Jan. 21, 2016

(30) Foreign Application Priority Data
Feb. 25, 2013    (BR) .............................. 102013004382

(51) Int. Cl.
*F02M 31/00*    (2006.01)
*F02D 19/06*    (2006.01)
(Continued)

(52) U.S. Cl.
CPC ......... *F02D 19/0605* (2013.01); *F02D 19/08* (2013.01); *F02D 19/084* (2013.01);
(Continued)

(58) Field of Classification Search
CPC ..... F02D 19/0605; F02D 19/08; F02M 43/04; F02M 31/14; F02F 19/084; Y02T 10/36; Y02T 10/126
(Continued)

(56) References Cited

U.S. PATENT DOCUMENTS 3,898,968 A * 8/1975 Markus ................... F02B 53/10
                                                      123/557
3,968,775 A * 7/1976 Harpman ............... F02M 31/18
                                                      123/25 B
(Continued)

FOREIGN PATENT DOCUMENTS

DE         3105516 A1    9/1982
DE    102004040715 A1    3/2006
(Continued)

OTHER PUBLICATIONS

The International Searching Authority, International Search Report and Written Opinion for International Application No. PCT/BR2014/000066, filed May 27, 2014, 8 pages, European Patent Office, The Netherlands.

*Primary Examiner* — Marguerite McMahon
(74) *Attorney, Agent, or Firm* — Alston & Bird LLP

(57) ABSTRACT

The system is applied to an engine (M) having an injection system, a fuel feed line and a cooling system (CS), by means of a cooling fluid which circulates, through hot fluid ducts and cold fluid ducts, through the engine (M) and through a heat exchanger. The feed line has a first segment, connected to the injection system and provided with a first valve, to be closed when the fuel temperature is below a maximum value, and open when the fuel temperature reaches the maximum value. The feed line also has a second segment derived from the first and absorbing thermal energy from the hot fluid duct or from the combustion gases and provided with a second valve which remains open while the fuel (Continued)

temperature is lower than the maximum value, and which is closed when said temperature reaches the maximum value.

11 Claims, 3 Drawing Sheets

(51) Int. Cl.
  *F02M 31/14* (2006.01)
  *F02D 19/08* (2006.01)
  *F02M 43/04* (2006.01)
(52) U.S. Cl.
  CPC ............ *F02M 31/14* (2013.01); *F02M 43/04* (2013.01); *Y02T 10/126* (2013.01); *Y02T 10/36* (2013.01)
(58) Field of Classification Search
  USPC .......................................................... 123/557
  See application file for complete search history.

(56) References Cited

U.S. PATENT DOCUMENTS

| | | | | |
|---|---|---|---|---|
| 3,986,486 | A * | 10/1976 | Rabbiosi | F02M 31/16 123/552 |
| 4,180,036 | A * | 12/1979 | Wolf | F02M 31/16 123/557 |
| 4,258,676 | A * | 3/1981 | Lamm | B60H 1/02 123/142.5 R |
| 4,611,567 | A * | 9/1986 | Covey, Jr. | F02M 31/081 123/545 |
| 5,119,794 | A * | 6/1992 | Kushida | F02M 31/135 123/543 |
| 5,218,944 | A * | 6/1993 | Leonard | F02M 31/16 123/552 |
| 5,408,973 | A * | 4/1995 | Spangjer | F02M 31/08 123/478 |
| 6,626,162 | B2 * | 9/2003 | Shelor | F02D 33/003 123/541 |
| 2004/0200461 | A1 * | 10/2004 | Chu | F01N 5/02 123/557 |
| 2008/0078363 | A1 * | 4/2008 | Apperson | F02B 21/00 123/557 |
| 2012/0012085 | A1 * | 1/2012 | Rowley | F02M 27/02 123/557 |

FOREIGN PATENT DOCUMENTS

| | | |
|---|---|---|
| DE | 102008056892 A1 | 5/2010 |
| EP | 0407670 A1 | 1/1991 |
| WO | 2008/068203 A1 | 6/2008 |
| WO | 2010/073125 A2 | 7/2010 |
| WO | 2013/017321 A1 | 2/2013 |

* cited by examiner

THERMAL MANAGEMENT SYSTEM FOR THE FEEDING OF FUEL IN INTERNAL COMBUSTION ENGINES

CROSS REFERENCE TO RELATED APPLICATIONS

The present application is the U.S. National Phase of International Patent Application Serial No. PCT/BR2014/000066, filed on Feb. 25, 2014, which claims priority to Brazilian Patent Application Serial No. 1020130043826, filed Feb. 25, 2013. The contents of the foregoing applications are hereby incorporated by reference in their entireties.

FIELD OF THE INVENTION

The present invention refers to a system for allowing the controlled heating of the fuel to be injected in an internal combustion engine of the type which may run on more than one fuel, each presenting a respective flash or vaporization point different than those of the other fuels.

The thermal management system of the fuel to be supplied to the engine, which is the object of the present invention, was developed to operate only after the engine starts or during and also after the engine start, during the normal operation of the latter.

BACKGROUND OF THE INVENTION

There are well known in the art the cold start problems in the internal combustion engine of a vehicle in days in which the temperature is lower than 18 degrees Celsius, when the engine is supplied with a fuel mixture containing more than 85% ethanol and less than 15% gasoline.

The ethanol and the methanol, for example, present a high flash point and, for such reason, these fuels or mixtures containing a substantial percentage of these fuels, when below a certain temperature, do not spray adequately, impairing or even preventing its explosion inside the combustion chamber. This phenomenon, known as "cold start problem", is faced by vehicle users using ethanol or methanol, upon the cold start of the engine in cold days, usually in an ambient temperature lower than 18° C.

In order to overcome said cold start problem of the vehicle engine, there were provided solutions which, inject a small amount of gasoline in the combustion. Since the gasoline is more volatile than the ethanol and the methanol, it causes the lowering of the flash point of the fuel mixture to be burned in the combustion chamber, thereby allowing the engine to start.

However, the technique of injecting gasoline during the engine start causes a high level of emission of pollutants.

A system developed more recently in the market comprises the use of a heater to preheat the fuel for a few seconds before the engine start, in order that, upon the request of a start, the fuel to be injected is already in a temperature hot enough to be suitably sprayed in the combustion chamber, thus allowing a satisfactory start of the vehicle engine, without the need of the extra gasoline injection. This system represents a more sophisticated technique which may reduce the level of pollutants produced during the vehicle start.

A major challenge of using the preheating system is due to the need for developing highly efficient heaters, otherwise the high electrical energy demanded by the cold start heaters may cause the discharge of the vehicle battery after a few successive starts. It should be observed that, during the engine start, it is already required a huge energy peak for feeding the starter motor, even without the cold start heaters.

Thus, the technical solutions presented so far only target the solution of the "cold start problem".

However, the "cold start problem" is just one of the many problems regarding efficiency and emission of pollutants caused by the burning of the cold or not heated fuel. Besides the cold start problems in low temperature environments when using a fuel of high flash point, there is an additional problem, caused by the natural difficulty of burning any fuel, when the latter is at a temperature interiorly distant from that of its flash point, or commonly named "cold fuel".

It should also be pointed out that the vaporization point of a liquid depends on the pressure in which, the latter is found. The typical pressure inside a fuel line in 1.0 liter vehicles of indirect injection is around 4.2 bar, a condition in which the vaporization temperature of the fuel is higher than the vaporization temperature when the fuel is under atmospheric pressure. For vehicles having direct fuel injection these values (pressure and vaporization temperature) are further increased.

The increase in temperature of the fuel is just one means for achieving a fuel spray formed by micrometric pulverized droplets, which will burn more easily when in contact with the spark from the ignition coil in the combustion chamber or when the fuel is compressed therein to a certain pressure (diesel fuel).

Theoretically, an engine running in a steady state would be hot enough to keep running, even if the fuel injected in the combust ion chamber is somewhat "cold", for there is some amount of thermal exchange between the heat dissipated by the engine (or combustion chamber) and the fuel, for a brief moment. However, this is not a working condition which presents an optimized thermo-energetic efficiency.

It is not rare to detect engine faults, jolts, engine slow response after pressing the gas pedal or even high emission of pollutants due to a deficient fuel burning. In "flex vehicles" (driven by ethanol and/or gasoline in any mixture proportion) it is known that the engine yield is not optimized, since it is an engine which has to function reasonably well with both types of fuel, however it is not the ideal engine to run only on gasoline or only on ethanol. An effective heating system, having thermal management of the fuel, tends to provide optimized conditions when raising the fuel (for example, ethanol or gasoline) to better burning conditions (by heating the fuel to temperatures closer to the vaporization point thereof) and to a consequent better yield of the engine.

A heating system having thermal management of fuel to be maintained operating during the entire time the engine is running would be an effective solution to achieve high performance (energetic optimization) of the engine, better vehicle handling, with fast responses when pressing the accelerator pedal, with optimized torque and power and lower pollutant emissions not only in "flex" type vehicles (two or three fuels), but also in vehicles provided with an internal combustion engine running on just one fuel, liquid or gas.

The radiator of a vehicle is a heat exchanger whose goal is to cool the engine (or protection against over-heating). For exchanging the heat of the engine and the components thereof to the radiator, water is used as the intermediate (circulating) fluid, acting like a "heat carrier" between the engine and the radiator.

Presently, the heat transmitted to the radiator water is lost, even unwanted energy, since if this heat is stored in the water the latter loses its efficiency as a thermal exchange fluid. The colder the radiator water, the more heat amount it will be able to absorb from the engine in a shorter period of time.

Another thermal exchange point which is essential for the proper operation of the vehicle engine is the one that occurs between the lubricant oil and the engine parts, the oil having two vitally important functions: lubrication and cooling of the engine components, in which in some parts such as the crankshaft, bearings, camshaft, rods and pistons, the cooling is only carried out by the engine oil.

The oil, when overheated, loses viscosity and is more exposed to deterioration, and therefore loses its lubrication properties, which may cause from poor operation of the engine components to major damages or even destruction of the vehicle engine. Nowadays, some vehicles present an oil cooler. It comprises a heat exchanger, usually of the plate type, located between the engine block and the oil filter, or being part of the oil module itself (in this case, more commonly found in heavy vehicles), functioning as a heat exchange enhancer between the lubricant oil and the radiator. However, oil coolers presently used do not exchange heat with the fuel.

Thus, it is highly desirable to provide a system which is able to use the thermal energy generated by the engine such as, for example, by the cooling of the cooling fluids (oil and water) of the vehicle engine or by the combustion gases and simultaneously to heat the fuel to temperatures closer to the vaporization point. This would be advantageous in order to optimize the energetic efficiency in the engine cooling, besides improving the level of emission of pollutants due to the better burning of the heated fuel.

SUMMARY OF THE INVENTION

Due to the lack of energetic efficiency in burning fuel in an internal combustion engine, when operating under certain conditions of temperature and revolutions, the present invention has as an object to provide a thermal management system for the feeding of fuel in one of these engines, which can selectively use the thermal energy generated by the engine to heat the fuel to be supplied to the latter during its operation.

The present thermal management system for the feeding of fuel is applied to an internal combustion engine which comprises: a fuel injection system associated to a fuel feed line; a cooling system, using at least one cooling fluid which circulates, through hot fluid ducts and cold fluid ducts, through parts of the engine and through a heat exchanger; and an exhaust tubing for the combustion gases.

According to the invention, the fuel feed line comprises: a first segment directly connected to the injection system and provided with a first valve which is automatically closed, when the temperature of the fuel supplied to the injection system is below a predetermined maximum value, lower than the vaporization temperature of the fuel, and which is open when the fuel temperature reaches said maximum value; and a second segment defining a by-pass to the first segment and located in order to absorb thermal energy of at least one of the heat sources, defined by the hot fluid being taken to the heat exchanger and by the combustion gases being released by the exhaust tubing, said second, segment being provided with a second valve and with a one-way valve, respectively located upstream and downstream in relation to the heat source, the second valve being automatically open while the fuel temperature is lower than said predetermined maximum value, and closed when the fuel temperature reaches said predetermined maximum value.

The first and the second valve may be thermostatic or electromagnetic, in which case they should have their actuation controlled by an electronic control module which commands the closing and opening of the valves as a function of a number of operational parameters, such as temperature and flash point of the fuel, either single or as a mixture, being supplied to the injection system, engine rotation, injection pressure, etc.

Therefore, the invention provides an automatically managed system, for carrying out the following thermal exchanges:

Thermal Exchange between the lubrication oil and the fuel to be fed to the engine; in this case it is obtained the advantages of cooling the oil and heating the fuel.

Thermal Exchange between the fluid (water), circulating by the hot fluid (water) duct leading to the radiator of the vehicle, and the fuel to be fed to the engine; in this case it is obtained the advantages of cooling the radiator water, with energetic use for heating the fuel to be fed to the engine.

Thermal exchange between the lubrication oil, the radiator water and the fuel to be fed to the engine; in this case, with a triple thermal exchange, it is obtained the advantages of cooling the oil and the radiator water, with a double energetic use for heating the fuel to be fed to the engine.

Thermal Exchange between the exhaust gases, released by the exhaust tubing of the engine, and the fuel to be fed to the engine, with energetic use of the heat which, is usually dissipated into the environment.

The system proposed herein and defined above allows the fuel, whether single or in a mixture, to be conducted to the injection system of the engine in an improved temperature condition for its combustion and being automatically controlled.

The present system allows the fuel to be fed to the engine at suitable temperature and pressure values, thereby reducing fuel consumption, reducing damages to the environment and improving the efficiency both of the engine and of the vehicle to which it is associated, the thermal energy used for the selective heating of the fuel being obtained from the thermal energy dissipated by the internal combustion engine.

BRIEF DESCRIPTION OF THE DRAWINGS

The invention will be described below, with reference to the enclosed, drawings, given by way of example of possible configurations for the management system. In the drawings.

DESCRIPTION OF THE INVENTION

As already mentioned and illustrated in the attached drawings, the invention is applied to internal combustion engines using a single fuel or a variable mixture of fuels presenting different vaporization temperatures, such as the case of "flex" engines using gasoline, ethanol or a mixture thereof in different proportions.

The management system of the invention was developed to operate during the entire operation of the vehicle, in order to keep the fuel being fed to the engine at an optimized temperature for an efficient combustion, lower than that of the vaporization point.

Figure 1:
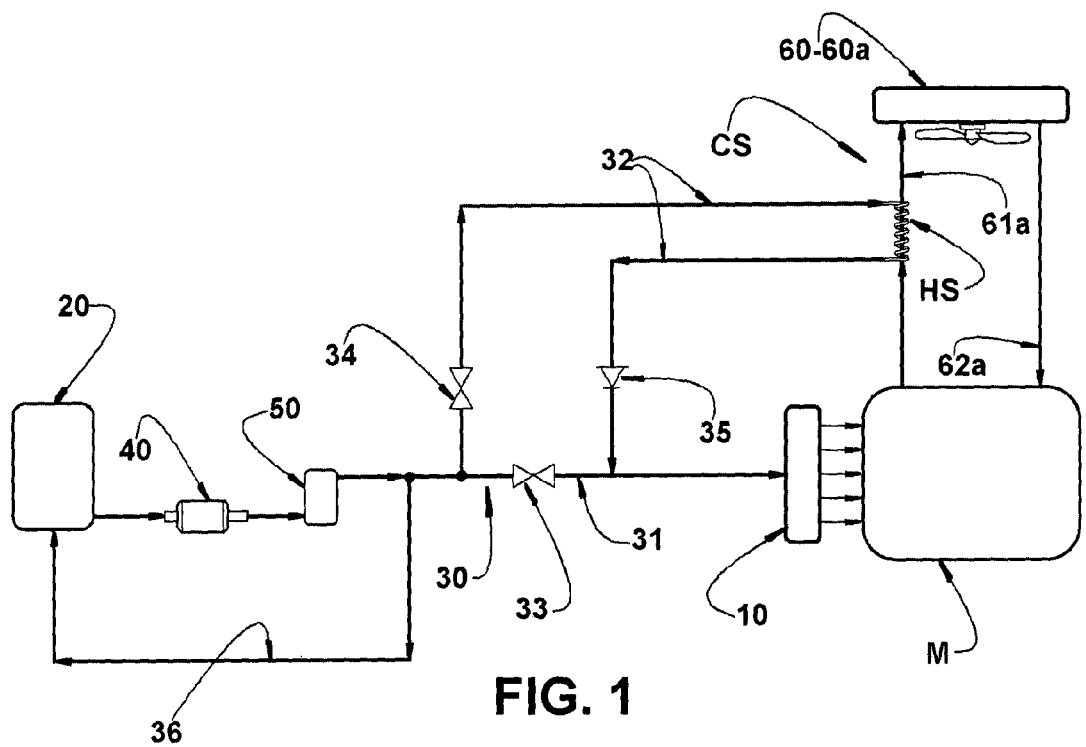
FIG. 1 represents a diagram of the management system of the invention, when using thermostatic valves and absorbing thermal energy from the hot water flow of the cooling system which is conducted from the engine to a heat exchanger in the form of a radiator.

FIG. 1 of the attached drawings illustrates a possible embodiment for the present management system, when applied to an engine M of internal combustion provided with an injection system 10 which is supplied by a fuel tank 20, by means of a fuel feed line 30, to which are associated a fuel pump 40 and a filter 50.

In this first construction, the engine M is provided with a cooling system CS which uses a heat exchanger 60, in the form of a radiator 60a, and a cooling fluid defined by water and which is circulated, by means of a hot fluid duct 61a and of a cooled fluid duct 62a, through parts of the engine M and through the heat exchanger 60.

In said first embodiment, the fuel feed line 30 comprises a first segment 31, directly connected to the injection system 10 and provided with a first valve 33, and a second segment 32 which defines a by-pass to the first segment 31 and which is located in order to absorb thermal energy from a heat source HS defined by the hot fluid, in the form of hot cooling water, which is taken, through the hot fluid duct 61a, to the heat exchanger 60 defined by the radiator 60a.

The second segment 32 of the fuel feed line 30 is provided with a second valve 34, located upstream the heat source HS, and with a one-way valve 35 located downstream said heat source HS.

Figure 5:
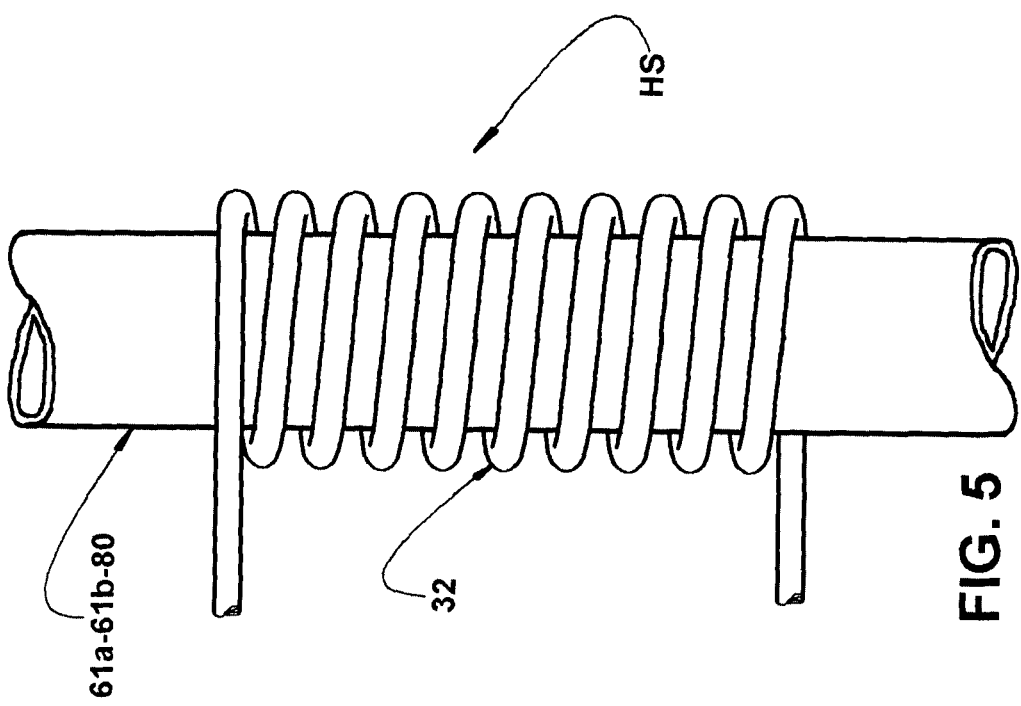
FIG. 5 represents a schematic longitudinal cross-sectional view of a possible constructive arrangement for the heat exchange between the hot flows of cooling water, lubricant oil or combustion gases, to the fuel to be supplied to the injection system of the engine.

The thermal energy absorption from the heat source HS may be carried out in different ways, such as, for example, by winding an extension of the second segment 32 of the fuel feed line 30 around the hot fluid duct. 61a leading to the heat exchanger 60 which, in FIG. 1, is defined by the radiator 60a. This construction is illustrated in FIG. 5.

Figure 6:
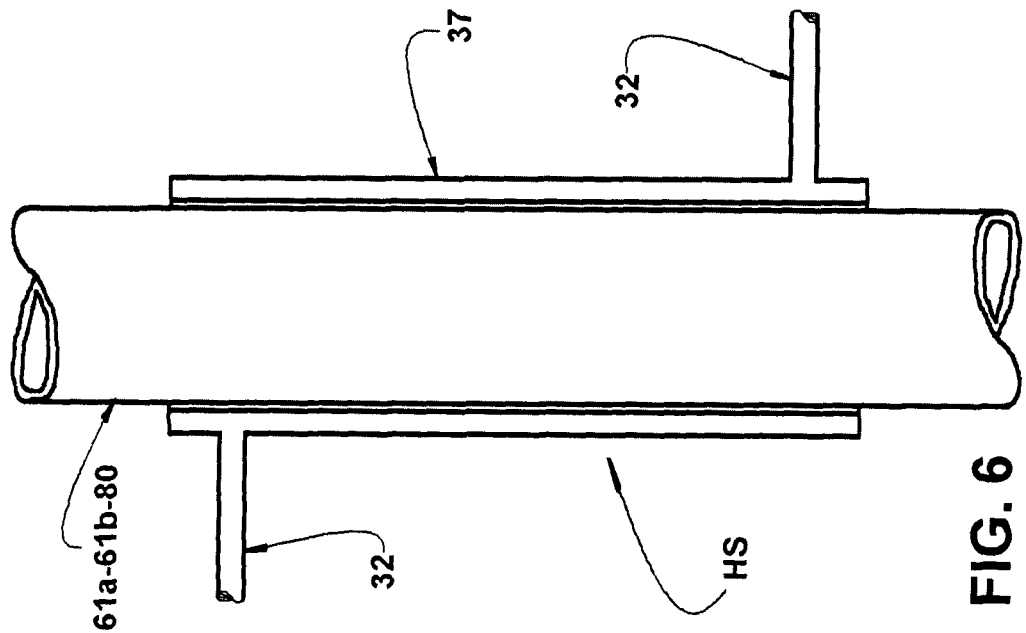
FIG. 6 represents a schematic longitudinal cross-sectional view of another possible construction arrangement for the heat exchange between the hot flows of cooling water, lubricant oil or combustion gases, to the fuel to be supplied to the injection system of the engine.

Another form of absorbing the thermal energy from the heat source HS is illustrated in FIG. 6 and comprises passing an extension of the second segment 32 of the fuel feed line 30 through the interior of the hot fluid duct 61a leading to the heat exchanger 60.

The present management system is built to promote: the automatic closing of the first valve 33 when the temperature of the fuel supplied to the injection system 10 is below a predetermined maximum value, lower than the vaporization temperature of the fuel; the automatic opening of said first valve 33 when the temperature of the fuel reaches said maximum value; the automatic opening of the second valve 34, while the temperature of the fuel is lower than said maximum value; and the closing of the second valve 34 when the fuel temperature reaches said maximum value.

In the construction illustrated in FIG. 1, the first valve 33 and the second valve 34 have their automatic operations carried out by their own constructive characteristics, such as the case, for example, of the thermostatic valves. However, it should be understood that these valves may be of the electromagnetic type, commanded by an electronic control system, as described further below.

In the constructive solution of FIG. 1, it is provided a return tube 36 connecting the fuel tank 20 to a point of the feed tube 30, located upstream the second segment 32, allowing that only the fuel required by the injection system 10 is subjected, if necessary, to the absorption of the thermal energy from the heat source HS.

The return tube 36 may be provided with a non-illustrated, pressostatic valve, in order to allow the return of the fuel in a certain pressure level in the input of the injection system.

Figure 2:
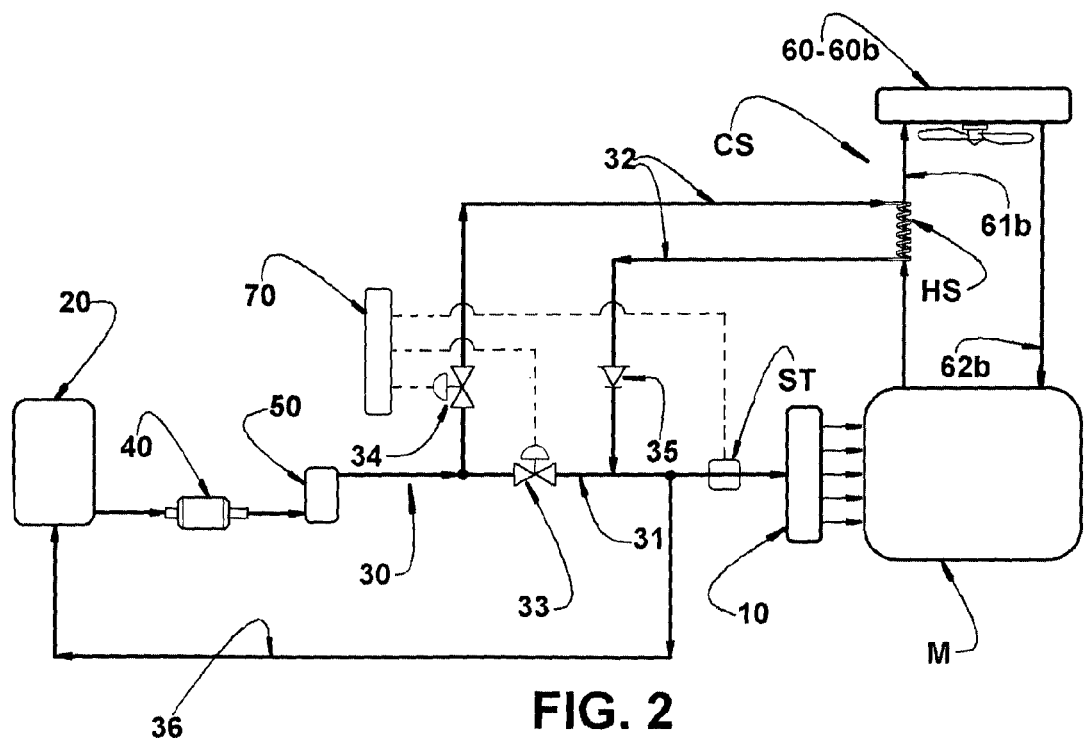
FIG. 2 represents a diagram of the management system of the invention, when using thermostatic valves and absorbing thermal energy from the hot lubrication oil flow and which is conducted from the engine to a heat exchanger in the form of an oil radiator.

In FIG. 2 of the attached drawings it is illustrated, a second embodiment for the present management system, when applied to an engine M presenting the same basic characteristics already described in relation to the engine represented in FIG. 1 and which are presented with the same reference numbers.

In said second embodiment, the engine M is provided with a cooling system CS which uses a heat exchanger 60, in the form of an oil radiator 60b, and a cooling fluid defined by the lubricant oil of the engine M and which circulates, by means of a hot fluid duct 61b and a cooled fluid duct 62b, through parts of the engine M and through the heat exchanger 60.

As already described above in relation to the construction of FIG. 1, in the construction of FIG. 2 the fuel feed line 30 comprises the same first and second segments 31, 32 located in the same manner and also provided with a first valve 33, a second valve 34 and a one-way valve 35, which operate according to the temperature of the fuel being fed to the engine M, in the same manner already described in relation to FIG. 1.

However, in the second embodiment the second segment 32 is located in order to absorb thermal energy from a heat source HS defined by the hot fluid, in the form of the heated lubricant, which is taken, through the hot fluid duct 61b, to the heat exchanger 60 defined by the oil radiator 60b.

The absorption of thermal energy from the heat source HS may be carried out in different manners such as, for example, those illustrated in FIGS. 5 and 6 and previously described in relation to the construction of FIG. 1.

A particularity of the construction illustrated in FIG. 2 results from the fact that the first valve 33 and second valve 34 are of the electromagnetic type, commanded by an electronic control unit 70 which receives a number of operational parameters from the engine M and of physico-chemical conditions from the fuel (such as temperature of the fuel being supplied, characteristics of the fuel or of the mixture of different fuels, such as volumetric percentage of each fuel and an estimate of evaporation point of the mixture, fuel injection pressure, pressure loss, engine temperature, mass and temperature of the intake air), in order to determine the maximum value of the temperature to be used for informing the operation of the first and second valves 33, 34.

In the constructive solution of FIG. 2, a return tube 36 is provided, connecting the fuel tank 20 to a point of the feed tube 30, located downstream the second segment 32, causing the entire pumped and filtered fuel being conducted through the feed tube 30 to undergo thermal energy absorption from the heat source HS upon the opening of the second valve 34 and closing of the first valve 33.

Figure 3:
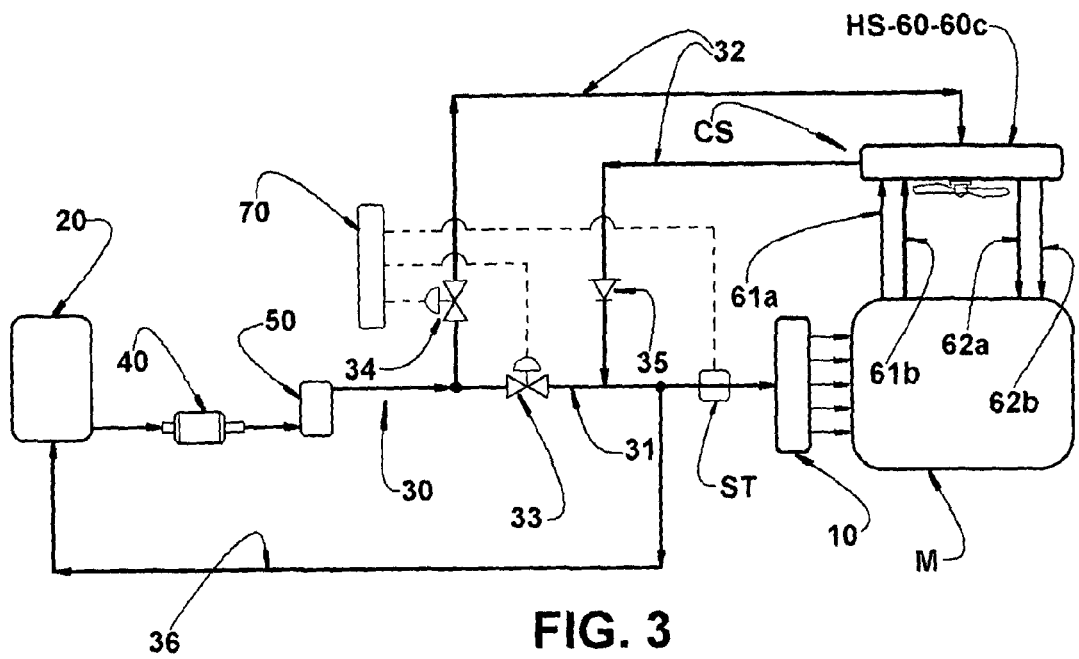
FIG. 3 represents a diagram of the management system of the invention, when using electromagnetic valves and absorbing thermal energy from both the hot cooling water flow and the hot lubrication oil flow, and which are conducted from the engine to a single heat exchanger.

In FIG. 3 of the attached drawings is illustrated a third embodiment for the present management system, when applied to an engine M presenting the same basic characteristics already described in relation to the engine represented in FIGS. 1 and 2 and which are identified with the same reference numbers.

In said third embodiment, the engine M is provided with a cooling system CS which uses a heat exchanger 60, in the form of a double radiator, of water and oil, built to simultaneously receive a flow of the lubricant oil from the engine M, a flow of cooling fluid, usually water based, and also a flow of fuel to be supplied to the injection system 10 of the engine M.

In this third embodiment the cooling of the engine M is carried out by the circulation of water through the heat exchanger 60, through a hot fluid duct 61a and through a cooled fluid duct 62a, both ducts allowing the water to leave the engine M through the hot fluid duct 61a, through the double radiator 60c and to return to engine H through the cooled fluid duct 62a. The cooling of engine M is also assisted by another cooling fluid defined by the lubricant oil which circulates, leaving engine M through the hot fluid duct 61b, through the double radiator 60c and returning to the engine through the cooled fluid duct 62b.

In this construction the heat source HS is defined by the hot fluids, in the form of heated water and lubricant oil, which are taken through the respective hot fluid ducts 61a, 61b.

As already described above in relation to the construction of FIG. 2, in the construction of FIG. 3 the fuel feed line 30 comprises the same first and second segments 31, 32 located in the same manner and also provided with a first valve 33, a second valve 34 and with a one-way valve 35, which operate according to the temperature of the fuel being supplied to the engine M, in the same manner as already described in relation to FIGS. 1 and 2.

However, in the third embodiment, the second segment 32 is located in order to absorb thermal energy from a heat source HS defined by the hot fluids, in the form of heated water and lubricant oil, which are respectively conducted outwardly from the engine M, through the not fluid ducts 61a and 63b, to the heat exchanger 60 defined by the double radiator 60c.

The absorption of thermal energy from the heat source HS may be carried out in different manners inside the double radiator 60c, the construction of the double radiator not being illustrated herein, since said construction does not modify the inventive concept proposed herein.

In the construction illustrated in FIG. 3, the first valve 33 and the second valve 34 are of the electromagnetic type, commanded, by an electronic control unit 70, in the same manner already described for the fuel flow control of the second embodiment illustrated in FIG. 2, with the same components represented by the same reference numbers. It should be understood that the valves used in the embodiment of FIGS. 2 and 3 may be of the thermostatic type, according to the embodiment of FIG. 1.

In the constructive solution of FIG. 3, a return tube 36 is provided connecting the fuel tank 20 to a point of the feed, tube 30, located downstream the second, segment 32, as illustrated and described in relation to the embodiment of FIG. 2.

Figure 4:
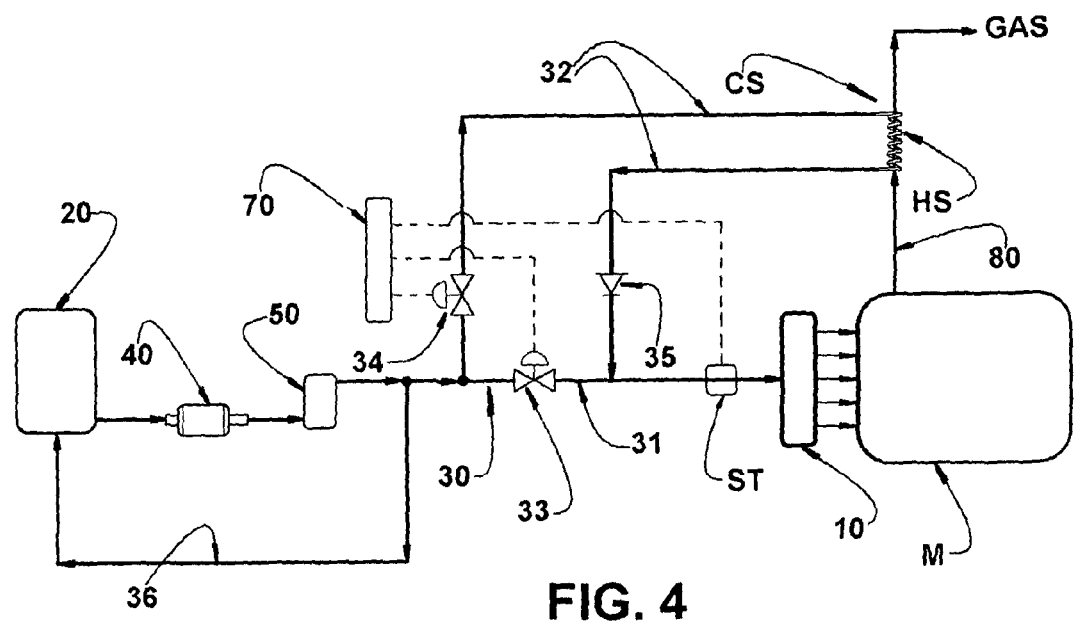
FIG. 4 represents a diagram of the management system of the invention, when using electromagnetic valves and absorbing thermal energy from the flow of combustion gases being released by the exhaust tubing.

In the construction illustrated in FIG. 4, the present management system presents the same basic elements already described in relation to the construction of FIGS. 1, 2 and 3 and identified with the same reference numbers. In this fourth embodiment, the return tube 36 is located as described in the embodiment of FIG. 1 and the heat source HS is defined by the exhaust gases released by the engine M through an exhaust tubing 80.

The thermal energy absorption from the heat source HS may be carried out in different manners such as, for example, by winding an extension of the second segment 32 of the fuel feed line 30 around a certain extension of the exhaust tubing 80 which conducts the exhaust gases out from the engine M. This construction is illustrated in FIG. 5.

Another form of absorbing the thermal, energy from the heat source HS is illustrated in FIG. 6 and comprises passing an extension of the second segment 32 of the fuel feed line 30 through a sleeve 37 surrounding the exterior of a certain extension of the exhaust tubing 80 which leads the exhaust gases out of the engine M.

The present management system may comprise thermostatic valves of automatic simpler operation or also electromagnetic valves individually assembled or in valve manifolds actuated from an electronic control unit 70, which is operatively associated with multiple sensors connected to the fuel supply system and to the engine M, in order to allow that the total or partial opening of the valve or valves occurs as a function of the real necessities of fuel heating to a temperature lower than the vaporization temperature of the fuel, single or mixture. The management system shall keep the temperature of the fuel being supplied to the engine M at a value always below the vaporization temperature. The management system using an electronic control unit 70 may present different sophistication levels regarding the operational parameters to be processed for defining the operational condition to be informed to valves 33 and 34, in order to reach an optimized efficiency in burning the fuel, without the risk of vaporizing the latter before its injection in the combustion chamber.

Knowing that the injection of heated fuel has a more significant efficiency in certain engine rotations, the sophistication of the management system makes possible to include rotation conditions of the engine in which the fuel would not go through the heat exchanger and other rotation conditions in which the fuel would go through the heat exchange. Or also different conditions of fuel flow, which would go through the heat exchanger, depending on the rotation of the engine M.

Connected to the engine rotation conditions, other parameters (described further below) may function as an indirect control of the temperature of the fuel to be injected by the injection system 10. Such parameters may be monitored by valves and/or sensors whose information are stored and calculated in the electronic control module 70. The latter, in turn, commands the opening/closing of the electromagnetic valves 33 and 34 in order to maintain the fuel at a temperature optimized for combustion.

Input parameters which may be measured and used for a more precise control of the temperature of the fuel to be injected:

Engine rotation: engine rotation values are already measured and stored in the electronic module of the vehicle at any time.

Fuel injection pressure: it is presently controlled fey a sensor, in order to maintain a constant injection pressure in the fuel line. Nowadays, there are vehicle versions in which the line pressure varies by command of the electronic control unit.

Percentage of each fuel of the mixture (flex vehicles) and indirect calculation of the vaporization point of the mixture; this function is already executed in present vehicles. The lambda-probe sensor reads the combustion exhaust gases and the calculation is executed by the vehicle control unit itself.

Mass and temperature of the intake air: presently this information is already provided in the vehicles. The reading and calculation are executed by pressure and temperature sensors (usually installed in the intake manifold or in the air filter) and vehicle electronic unit.

Engine temperature: presently monitored. Important for controlling the present cold start systems.

Direct temperature of the fuel: presently not directly monitored. However, it may be monitored by a temperature sensor, for example, the St sensor of FIGS. 2, 3 and 4, and compared to the engine temperature. This comparison could be executed by the vehicle electronic module, which would have a more precise control of the advance/delay in the combustion ignition (in vehicles which use ignition for combustion) and of the ideal temperature for injection of the fuel (control of the fuel passing through the heat exchanger). In this ease, the crossing of engine temperature data with fuel temperature for a more refined optimization of the ignition point and ideal combustion temperature would also be an innovation.

The invention claimed is:

1. A thermal management system for the feeding of fuel in internal combustion engines of the type comprising: an injection system associated to a fuel feed line; a cooling system (CS), using at least one cooling fluid which circulates, through hot fluid ducts and cold fluid ducts, through parts of the engine (M) and of a heat exchanger; and an exhaust tubing for the exhaust gases, the system wherein the fuel feed line comprises:
   a first segment which is directly connected to the injection system and provided with a first valve, to be automatically closed when the temperature of the fuel supplied to the injection system is below a predetermined maximum value, which is lower than, the vaporization temperature of fuel, and automatically open, when the fuel temperature reaches said maximum value; and
   a second segment defining a by-pass to the first segment and located in order to absorb thermal energy from at least one of the heat sources (HS), defined by the hot fluid being taken to the heat exchanger and by the combustion gases being released by the exhaust tubing, said second segment having a first portion intersecting the first segment upstream of the first valve and a second portion intersecting the first segment downstream of the first valve, said second segment being provided with a second valve on the first portion located upstream in relation to the heat source (HS) and with a one-way valve on the second portion located downstream in relation to the heat source (HS), the second valve being automatically open, while the temperature of the fuel is lower than said maximum value and automatically closed when the temperature of the fuel reaches said maximum value, such that the first and second valves are never simultaneously both open or both closed.

2. The system, as set forth in claim 1, wherein the heat exchanger is defined by a radiator, through which circulates, through the hot fluid duct and cold fluid duct, a cooling fluid defined by water which circulates inside parts of the engine (M).

3. The system, as set forth in claim 2, wherein the heat source (HS) is defined by the hot fluid, in the form of heated cooling water, which is conducted through the hot fluid duct.

4. The system, as set forth in claim 1, wherein the heat exchanger is defined by an oil radiator, through which circulates, through the hot fluid duct and cold fluid duct, a cooling fluid defined by lubricant oil which circulates inside parts of the engine (M).

5. The system, as set forth in claim 4, wherein the heat source (HS) is defined by the hot fluid, in the form of heated lubricant oil, which is conducted through the hot fluid duct.

6. The system, as set forth in claim 1, wherein the heat exchanger is defined by a double radiator, for water and oil, through which circulates, by respective hot fluid ducts and cool fluid ducts, a first cooling fluid, defined by lubricant oil of the engine (M) and a second cooling fluid defined by water that circulates inside parts of the engine (M).

7. The system, as set forth in claim 6, wherein the heat source (HS) is defined by the hot fluids, in the form of heated water and lubricant oil, which are conducted through the respective hot fluid ducts.

8. The system, as set forth in claim 1, wherein the heat source (HS) is defined by the exhaust gases released by the engine (M) through an exhaust tubing, an extension of the second segment of the fuel feed line being provided in external contact with a respective extension of the exhaust tubing.

9. The system, as set forth in claim 1, wherein the first and the second valves are thermostatic valves.

10. The system, as set forth in claim 1, wherein the first and the second valves are electromagnetic valves, operatively associated with an electronic control unit which commands the operational condition of said valves in function of the operational parameters of the engine (M) and of the physicochemical conditions of the fuel.

11. The system, as set forth in claim 1, comprising a fuel tank, wherein the system further comprises a return tube connecting the fuel tank to a point of the fuel feed line located upstream or downstream the second segment.

* * * * *